United States Patent
O'Brien

(10) Patent No.: US 10,535,111 B2
(45) Date of Patent: Jan. 14, 2020

(54) APPARATUS, CODE, METHODS AND SYSTEMS FOR PROVIDING PROOF OF TRUST RELATED TO SMART CONTRACTS

(71) Applicant: The Proof of Trust Limited, London (GB)

(72) Inventor: Patrick Damien O'Brien, Chesire (GB)

(*) Notice: Subject to any disclaimer, the term of this patent is extended or adjusted under 35 U.S.C. 154(b) by 0 days.

(21) Appl. No.: 16/225,324

(22) Filed: Dec. 19, 2018

(65) Prior Publication Data
US 2019/0122300 A1 Apr. 25, 2019

Related U.S. Application Data

(63) Continuation of application No. 14/693,855, filed on Apr. 22, 2015, now Pat. No. 10,198,769, which is a (Continued)

(51) Int. Cl.
*G06Q 50/34* (2012.01)
*G07F 17/32* (2006.01)
(Continued)

(52) U.S. Cl.
CPC ............ *G06Q 50/34* (2013.01); *G06Q 40/04* (2013.01); *G07F 17/326* (2013.01); (Continued)

(58) Field of Classification Search
None
See application file for complete search history.

(56) References Cited

U.S. PATENT DOCUMENTS 5,895,450 A * 4/1999 Sloo .................. G06Q 10/10
705/309
2017/0046693 A1* 2/2017 Haldenby .......... G06Q 20/0655
(Continued)

FOREIGN PATENT DOCUMENTS

WO WO-2019100112 A1 * 5/2019 ............. G06F 21/00

OTHER PUBLICATIONS

Riikka Koulu, "Blockchains and Online Dispute Resolution: Smart Contracts as an Alternative to Enforcement," (2016) 13:1 SCRIPTed 40 https://script-ed.org/?p=2669 DOI: 10.2966/scrip.130116.40. (Year: 2016).*

*Primary Examiner* — Jan P Mincarelli
(74) *Attorney, Agent, or Firm* — Allen F. Bennett; Bennett Intellectual Property

(57) ABSTRACT

Code which when executed on a server is for recording a verified contract outcome associated with contracts before adding to a blockchain. The code receives protocols associated with a triggering event intended to occur in the future. If no disputed information is received within a predetermined amount of time after the triggering event, then recording the contract outcome information on a distributed ledger. If disputed information is received within the predetermined amount of time, then having a decentralized network of third-parties perform a third-party analysis of the disputed information. Displaying graphical representations associated with status information before a consensus contract outcome is determined based upon third-party analysis. Consensus contract outcome information associated with the consensus contract outcome is configured to display graphical representations to the parties of the contract and the consensus contract outcome information is recorded as the verified contract outcome on a distributed ledger.

15 Claims, 11 Drawing Sheets

Related U.S. Application Data continuation of application No. 14/257,985, filed on Apr. 21, 2014, now Pat. No. 9,033,798, which is a continuation of application No. 13/899,569, filed on May 22, 2013, now Pat. No. 8,727,869.

(51) Int. Cl.
*G07F 17/34* (2006.01)
*G06Q 40/04* (2012.01)

(52) U.S. Cl.
CPC ...... *G07F 17/3225* (2013.01); *G07F 17/3244* (2013.01); *G07F 17/3276* (2013.01); *G07F 17/3286* (2013.01); *G07F 17/34* (2013.01); *G07F 17/3288* (2013.01)

(56) References Cited

U.S. PATENT DOCUMENTS

2018/0005186 A1\* 1/2018 Hunn .................... G06F 17/211
2018/0082390 A1\* 3/2018 Leidner ................. G06F 16/00

\* cited by examiner

| Rating | Incorrect | Adjustment | Reward |
|---|---|---|---|
| 100 | 0 | $2^0$ | 100 |
| 99 | 1 | $2^1$ | 98 |
| 98 | 2 | $2^2$ | 96 |
| 97 | 3 | $2^3$ | 92 |
| 96 | 4 | $2^4$ | 84 |
| 95 | 5 | $2^5$ | 68 |

FIG. 6A $$\sum_r - 2i = i^1, i^2, i^3, i^4, i^5$$

FIG. 6B

APPARATUS, CODE, METHODS AND SYSTEMS FOR PROVIDING PROOF OF TRUST RELATED TO SMART CONTRACTS

CROSS-REFERENCE TO RELATED APPLICATIONS

This application is a continuation in part of U.S. patent application Ser. No. 14/693,855, filed Apr. 22, 2015 now U.S. Pat. No. 10,198,769, which is a continuation of U.S. patent application Ser. No. 14/257,985, filed Apr. 21, 2014, now U.S. Pat. No. 9,033,798, which is a continuation of U.S. patent application Ser. No. 13/899,569, filed May 22, 2013, now U.S. Pat. No. 8,727,869, and U.S. Provisional Application Ser. No. 62/636,763 titled "SYSTEMS, METHODS AND APPARATUS FOR AUTHENTICATING AND VERIFYING TRANSACTION OUTCOMES ASSOCIATED WITH BLOCK CHAIN TECHNOLOGIES", filed Mar. 7, 2018 the entire contents of all of which are included herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates to the technology to distributed ledger technology and electronic transaction systems.

BACKGROUND

Blockchain technology or the blockchain is a relatively new technology. Blockchain is further explained in a 2008 article by Satoshi Nakamoto, titled "Bitcoin: A Peer-to-Peer Electronic Cash System," the entire contents of which are hereby incorporated by reference. The blockchain is a data structure that stores a list of transactions and can be thought of as a distributed electronic ledger that records transactions between source identifiers and destination identifiers. Each transaction of the blockchain is bundled into blocks and every block (except for the first block) refers back to or is linked to a prior block in the chain. Computer nodes maintain the blockchain and cryptographically validate each new block and thus the transactions contained in the corresponding block. This validation process includes solving a computationally difficult problem that is also easy to verify and is sometimes called a "proof-of-work."

While the transactions may be validated, the content or whether those transactions are valid is a major concern. The most celebrated aspect of Blockchain is that information is stored in an immutable ledger, distributed and trusted without the need for a central authority or intermediary party. While the focus on blockchain's value has traditionally been on its incorruptible, not enough attention is paid to the negative effects created when inputs to the trusted blockchain from any single source are untrustworthy. An example can be found in Bitcoin, where if a private key is stolen and a nefarious transaction is sent to the blockchain, the protocol will irreversibly report the transaction as valid, when in reality it was not. This is not an issue with the blockchain itself, rather, this is an issue with its data inputs. Said another way, while data integrity is enforced in the blockchain's distributed consensus protocol, there is still a significant obstacle in authenticating distributed trust and integrity of data inputs.

A Smart Contract is a computer protocol intended to digitally facilitate, verify, or enforce the negotiation or performance of a contract. Smart contracts were explained by Nick Szabo in a 1994 article titled "Smart Contracts" the entire contents of which are hereby incorporated by reference. A smart contract is a computerized transaction protocol that executes the terms of a contract or agreement. The general objectives of smart contract design are to satisfy common contractual conditions (such as payment terms, liens, confidentiality, and even enforcement) and related economic goals include lowering fraud loss, arbitration and enforcement costs, and other transaction costs. As smart contracts expand their capabilities to enforce predetermined outcomes, the question arises of whether additional layers of distributed consensus to validate data is necessary before data is immutably mined into a blockchain.

As a result, there exists a need for improvements over the prior art and more particularly for a more efficient and better way for proving the trust worthiness of the blockchain and smart contracts.

SUMMARY

Apparatus, code, methods, and systems for confirming, modifying, causing to be performed and recording outcome related to contracts between a first user and a second user is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, the invention includes apparatus, code, methods, and systems for confirming, modifying, causing to be performed and recording a verified contract outcome associated with each of a plurality of contracts between a first user and a second user. In one embodiment, the apparatus, code, methods, and systems are configured for: a) receiving, over a communications network, for each contract protocols associated with a triggering event intended to occur in the future; b) receiving, over the communications network, triggering event information associated with the triggering event: c) determining, based upon the protocols, a contract outcome based upon the protocols after the triggering event information is received; d) receiving, over the communications network, within a predetermined amount of time after the triggering event information has been received, disputed information associated with the contract outcome from at least one of a first user computing device and a second user computing device: e) if no disputed information is received within the predetermined amount of time, then recording the contract outcome information on a distributed ledger; f) if disputed information is received within the predetermined amount of time, then g) transmitting, over the communications network, the disputed information to the remote computing device of at least one third-party for each third-party to perform a third-party analysis of the disputed information; h) providing, over the communications network, a status information to at least one of a first graphical user interface of a first user computing device of the first user and a second graphical user interface of a second user computing device of the second user, wherein the status information is configured to display, on the first graphical user interface or second graphical user interface, a first graphical representation related to a status of the disputed information before a consensus contract outcome has been decided; j) receiving, over the communications network, third-party decision information associated with the disputed information from each third-party that performed the third-party analysis of the disputed information; k) determining the consensus contract outcome based upon third-party decision information received wherein the consensus contract outcome is derived from a threshold of matching third-party decision information; l) providing, over the communications network, a consensus contract outcome information associated with the consensus contract outcome to at least one of the first graphical user interface and the second graphical user interface, the consensus contract outcome information configured to display on the first or second graphical user interface a second graphical representation related to the consensus contract outcome; and, m) recording the consensus contract outcome information on a distributed ledger.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 6A is a table showing a rating adjustment for the rating for each third-party) for the apparatus, code, methods, and systems for confirming, modifying, causing to be performed and recording outcome related to contracts between a first user and a second user, according to an example embodiment:

FIG. 6B is a formula for calculating a third-party reward based upon third-party rating, for the apparatus, code, methods, and systems for confirming, modifying, causing to be performed and recording outcome related to contracts between a first user and a second user, according to an example embodiment;

DETAILED DESCRIPTION

Figure 1:
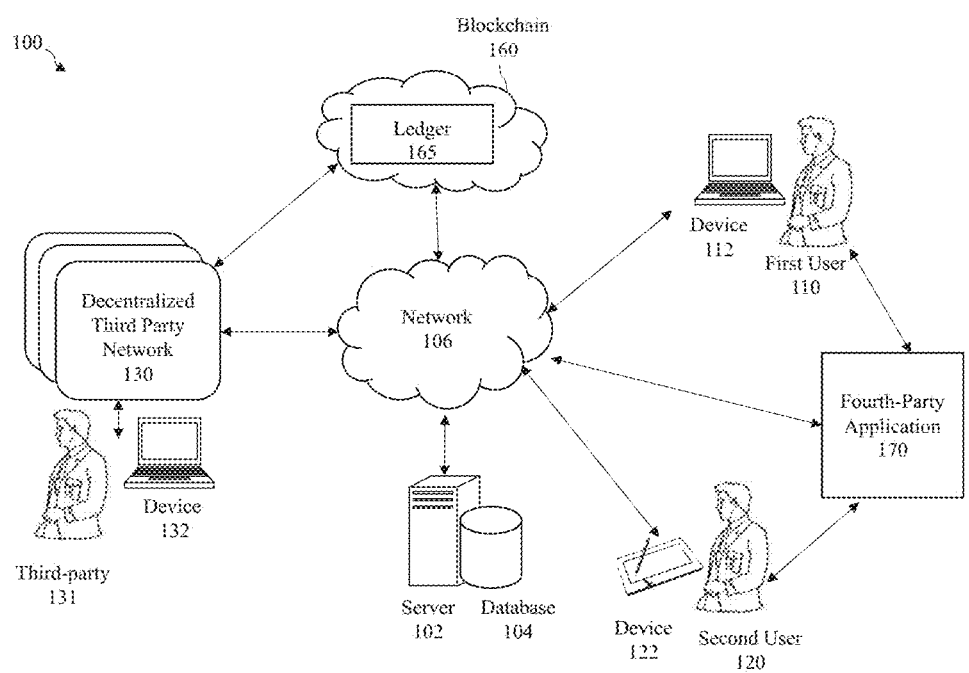
FIG. 1 is a diagram of an operating environment that supports apparatus, code, methods, and systems for confirming, modifying, causing to be performed and recording outcome related to contracts between a first user and a second user, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing additional layers of distributed consensus to validate the inputs even before their outcomes are propagated and mined into a blockchain. The present invention provides safeguards and incentives to allow commerce in a decentralized environment for confirming, modifying, causing to be performed and recording outcome related to smart contracts. The present invention acts as a filter using algorithms of various individual inputs for confirming, modifying, causing to be performed and recording outcomes related to smart contracts. The present invention also provides an improvement over the prior art by also providing code, apparatus, methods and systems for rating and auditing the third-parties that confirm, modify, causing to be performed and recorded the outcome related to smart contracts. The present invention provides an additional layer, proof of trust (POT), or proof and trust (PAT) by providing a consensus to validate the inputs even before their outcomes are propagated and mined into a blockchain. The present invention may also be used for providing a consensus based upon a distributed analysis.

Additionally, the present inventions improve over the prior art by providing an incentive, benefit or reward to third-parties for accurate information related to disputed transactions. Additionally, the system improves of the prior art by assigning a rating and adjusting the third-party rating of each of the third-parties based upon if their decision information is accurate and adjusting the incentives, benefit or reward provided to each of the third-parties based upon the rating of each third-party. Additionally, the system improves of the prior art by also providing to the users and third-parties graphical user interfaces that provide informative experiences, which may include entertaining experiences so that the users and third-parties remain engaged with the graphical user interfaces. The system improves over the prior art by providing entertaining experiences related to disputes between positions of users.

Referring now to the Figures, in which like reference designators refer to like elements, there is shown in FIG. 1 an illustration of a block diagram showing the network architecture of a system 100 for confirming, modifying, causing to be performed and recording outcome related to contracts between a first user and a second user in accordance with one embodiment. A prominent element of FIG. 1 is the server or processor 102 associated with repository or database 104 and further coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. Server 102 is a central controller or operator for functionality of the disclosed embodiments, namely, the sharing of electronic tickets between users.

The networked environment may also include a blockchain system 150 for storing one or more distributed ledgers 165 that records transactions. The transactions are bundled into blocks and every block (except for the first block) refers to or is linked to a prior block in the chain. Computer nodes may maintain the blockchain and cryptographically validate each new block and thus the transactions contained in the corresponding block.

A block chain or blockchain is a distributed database that maintains a list of data records on the ledger. The security of the block chain enhanced by the distributed nature of the block chain. A block chain typically includes several nodes. Each of the nodes may be one or more computers, databases, data stores, machines, operably connect to one another. In some cases, each of the nodes or multiple nodes are maintained by different entities. A block chain typically works without a central repository or single administrator. One well-known application of a block chain is the public ledger of transactions for cryptocurrencies such as used in bitcoin. The data records recorded in the block chain are enforced cryptographically and stored on the nodes of the block chain. A block chain provides numerous advantages over traditional databases. The nodes of a block chain may reach a consensus regarding the validity of a transaction contained on the transaction ledger. However, the verifying and allowing for disputes of the data related to the transaction is one aspect the present invention. Similarly, when multiple versions of a document or transaction exits on the ledger.

The block chain typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person, and blocks are created by users known as "miners" who use specialized software/equipment to create blocks. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases, that meets other criteria. In some block chain systems, miners are incentivized to create blocks by a rewards structure that offers a pre-defined per-block reward and/or fees offered within the transactions validated themselves. Thus, when a miner successfully validates a transaction on the block chain, the miner may receive rewards and/or fees as an incentive to continue creating new blocks.

FIG. 1 includes mobile computing devices 112, 122, and 132 which may be smart phones, mobile phones, tablet computers, handheld computers, laptops, or the like. Mobile computing devices 112, 122, and 132 correspond to a first user 110, a second user 120 and third-party network 130 having numerous third-parties 131, wherein each third-party may use a remote computing device 132, respectively. Each of the computing devices include a user interface and/or graphical user interface.

FIG. 1 further shows that server 102 includes a database or repository 104, which may be a relational database comprising a Structured Query Language (SQL) database stored in a SQL server. Devices 112, 122, and 132 may also each include their own database. The repository 104 serves data from a database, which is a repository for data used by server 102 and devices 120, 122, 150 during operation of the disclosed embodiments. Database 104 may be distributed over one or more nodes or locations that are connected via network 106. FIG. 1 may also include a fourth-party application 170 represents an application is configured for receiving information related to the contracts between the first user and second user. The fourth-party application may also be configured for effectuating payments between the first and second users. In one embodiment, the fourth party application be configured for determining the contract outcome and associated contract outcome information for providing it to the system where the system may wait for the predetermined amount of time before recording into the block chain unless the disputed information is received. In other embodiments, the fourth party application transmits the contract the system where the system determines the contract outcome and associated contract outcome information.

The database 104 may include a user record for each first user 110 or second user 120 and for each third-party 130. The system may be configured for creating a user record. A user record may include: A user record may include: contact/identifying information for the user (name, address, telephone number(s), email address, etc.), an IP address for a mobile computing device of the user, information pertaining to contracts associated with the user, contact/identifying information for friends of the user, electronic payment information for the user, information pertaining to the contracts made by the user, etc. A user record may also include a unique identifier for each user, a residential address for each user, the current location of each user (based on location-based services from the user's mobile computer) and a description of past contracts associated with each user. A user record may further include demographic data for each user, such as age, sex, income data, race, color, marital status, etc. In the present embodiment first user may enter into an agreement with a second user that includes a triggering event (further explained below).

The database 104 may also include a third-party record for each third-party 130. A third-party record may be created and may include contact/identifying information for the third-party (name, address, telephone number(s), email address, etc.), an IP address for a mobile computing device (s) of the user, information pertaining to contracts and third-party decision information (further explained below) associated with the user, consensus contract outcome information associated with the third-party, third-party reward information associated with each third-party. In in other embodiments, the third-party may be other computer systems configured for automatically receiving disputed information, performing a third-party analysis, determining the third-party outcome and transmitting the third-party decision information to the system for it to determine the consensus contract outcome information related to the consensus contract outcome. In one embodiment, each third-party may be an individual having access to a third-party remote computing device 132 having a user interface configured for receiving input. In other embodiment, the third-party may be an individual and may further include demographic data for each user, such as age, sex, income data, race, color, marital status, etc. Each third-party is defined is defined as an entity that receives disputed information (further explained below) related to a contract, performing an analysis (further explained below) of the disputed information, providing third-party decision information (further explained below) associated with the disputed information.

The database 104 may include a contract record for a contract entered between users. The contract may be a blockchain transaction. The system and code may be configured for creating a contract record based on information received. A contract record may include: a unique contract identifier, contact/identifying information for the user or users (unique identifier for the user, name, address, telephone number(s), email address, etc.) associated with the contract, an IP address for a mobile computing device of the user associated with the contract, consensus contract outcome information (further explained below), contract outcome information (further explained below), disputed information (further explained below), status information (further explained below), third-party decision information from a plurality of third-parties (further explained below), third-party reward information (further explained below), third-party rating information (further explained below).

A contract is defined as a Smart Contract associated with an agreement between a first user and a second user. As briefly explained above, Smart Contracts are computer processes that facilitate, verify and/or enforce negotiation and/or performance of a contract between parties. Smart contracts may include logic that emulates contractual clauses that are partially or fully self-executing and/or self-enforcing. Examples of Smart contracts are digital rights management (DRM) used for protecting copyrighted works, financial cryptography schemes, for financial contracts, admission control schemes. A contract may also be defined as an agreement associated with subject matter between and or associated with the first user and second user. The contract may include a contract for services, contract for goods, a contract for land, a blockchain transaction, an insurance contract, a contract for non-performance, a wager or competition where each user has a competitive position or position regarding a real time event or an outcome of a real time event. In each of the contracts, both users will have a position associated with the contract. Each position may be mutually exclusive or may not be mutually exclusive. However, it is also understood that other agreements between parties may be included and are within the spirit and scope of present invention.

In operation, the subject matter associated with the contract may include data elements that provide logic and/or protocols to determine if the one or more actions or events occurred. In other words, the contract includes protocols associated with a triggering event intended to occur in the future.

The database 104 may configured to store include triggering event information. The triggering event information includes data elements related to a triggering event. The triggering event information may be received from an outside source. In other embodiments, the system may be configured to monitor data to determine if a triggering event has occurred and then create triggering event information. The triggering event may be related to the subject matter of the contract. For example, the triggering event may be related to a commodity or security, an insurance policy, a sporting event, an action by a performing party, a non-performance by a performing party, etc. For example, a contract may include data elements to determine if a triggering event occurred. In one embodiment, the triggering event may be if action A was performed by a performing party B at a specific time C. Based upon the contract, the protocols may be such that if the action A was performed by the performing party B at a specific time C, then contract outcome=X. On the other hand, if the action A was not performed by a performing party B at a specific time C, then contract outcome=Y. As mentioned above, the subject matter associated with a contract may include a contract for services, contract for goods, a contract for land, an insurance contract, a contract for non-performance, a wager or competition, wherein each user has a competitive position regarding a real time event or an outcome of a real time event, a securities contract, a contract related to commodities or currencies. However, it is also understood that other agreements between parties may be included and are within the spirit and scope of present invention.

By way of another example, if the triggering event is related to a wager or competition between first user and the second user, information may be received from the first user computing device 112 associated with a first user corresponding to the first user's competitive position or business position regarding a real-time event. For example, the first user may select a certain team to win a sporting event, a specific currency or commodity to rise or fall a certain amount, prop bets, or any other selection associated with a real-time event. The information selected by the first user may be transmitted to a second user computing device associated with a second user identifying the real-time event the information related to the first user's position related to the real-time event. This information informs the second user of the first user's desire to initiate a real-time competition or offer to enter into a contract, and identified the real-time event, such as commodity valuation, a sporting event, etc. Next, information is received from the second user computing device 122 corresponding to the second user's position regarding the real-time event, such as a selection of a different commodity, etc. The triggering event may be if sports team A wins or loses a certain sporting event. In such an example, the protocols may be such that if the sports team A wins, then the first user shall pay a certain amount to the second user and if sports team A loses, then the second user shall pay a certain amount to the first user. By way of another example, the protocols may be such that if a certain commodity or currency rises or falls to a certain value by a certain point in time, then the first user shall pay a certain amount to the second user and if the commodity does not, then the second user shall pay a certain amount to the first user.

The database 104 may be configured to store and include contract outcome information for the contract. The contract outcome information includes data elements associated with a contract outcome of a contract based upon a triggering event that is intended to occur in the future. The contract outcome may be based upon the logic, contract protocols, instructions or conditions associated with the contract that may be satisfied related to the triggering event. The contract outcome information may be provided from outside sources or the contract outcome information may be created by the code, system or software. Using one of the examples above, a contract may include data elements to determine the contract outcome based if a triggering event occurred such as performance of an action A by a performing party B at a specific time C has occurred. If the action A was performed by the performing party B at a specific time C, then contract protocols may dictate that the contract outcome=X. On the other hand, if the action A was performed by a performing party B at a specific time C, then contract protocols may dictate that contract outcome=Y. In the above example, X and Y is the contract outcome. Another example of a contract outcome may be an outcome of the real-time event relative to the first user's competitive position and the second user's competitive position related to the wager or peer to peer competition described above. The contract outcome X and Y may include a performance, non-performance, payment of either the first user, second user or another party by the first user, second user or another party.

The database may also store disputed information related to the contract outcome. The disputed information includes data elements associated with information received if the first user or second user disputes the contract outcome. The disputed information may be received, over the communications network, from information and data input by the first user on the first user computing device, from information and data input by the second user on the second user computing device, or from other application such as the forth party) application. In one embodiment, the apparatus, code, methods and systems may be configured to interface with other applications such that the it receives the disputed information in a packet after the triggering event has occurred and after either first user or second user has disputed the contract outcome. In one embodiment, the contract protocols include the outcome of the contract after a triggering event has occurred. For example, the apparatus, code, methods and systems may be configured such they determine the contract outcome based upon data associated with the outcome of the real-time event relative to the first user's competitive position and the second user's competitive position related to the wager or peer to peer competition described above. In such an embodiment, the apparatus, code, methods and systems may be configured to pull data or receive from the information sources and databases to calculate the contract outcome. For example, information sources for sporting events may include database is related to ESPN™ CBS-SportsNet™. The disputed information may include data elements disputing the following: the triggering element, triggering element date, triggering element time, subject matter of the triggering element, portions of the triggering elements, contract outcome, the proposed outcome, logic why the contract outcome is disputed, portions of the proposed outcome etc. Additionally, other data may also be disputed and is within the spirit and scope of the present invention.

Figure 9:
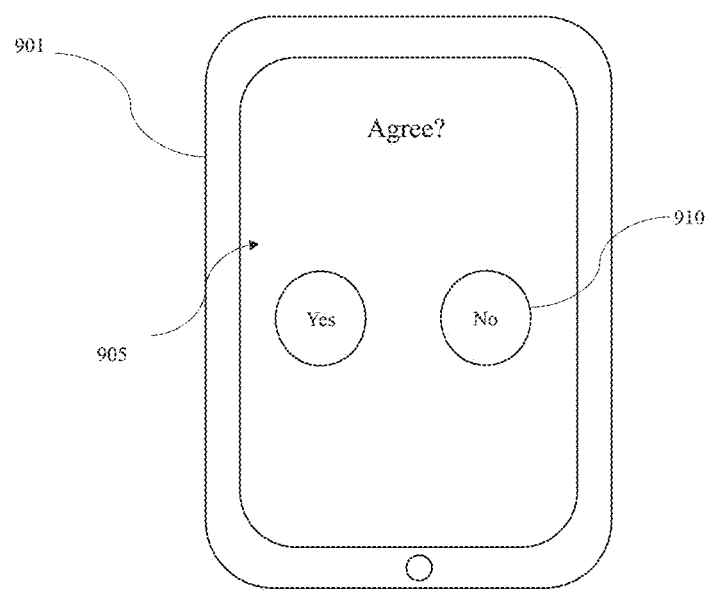
FIG. 9 is a user interface for receiving third-party-party decision information, according to an example embodiment.
Figure 10A:
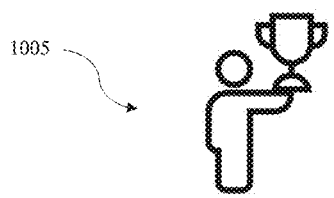
FIG. 10A is a first graphical representation of a reward, according to an example embodiment.
Figure 10B:
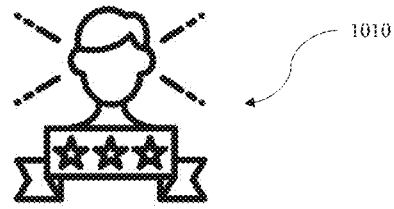
FIG. 10B is a second graphical representation of a reward, according to an example embodiment.
Figure 10C:
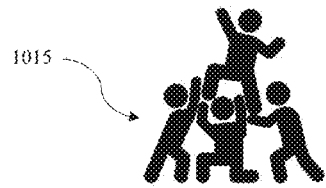
FIG. 10C is a third graphical representation of a reward, according to an example embodiment.
Figure 10D:
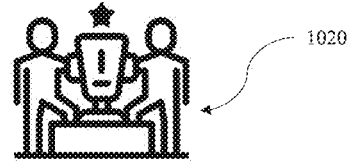
FIG. 10D is a fourth graphical representation of a reward, according to an example embodiment; and, FIG. 11 is a block diagram of a system including an example computing device and other computing devices.

The database may also be configured to store third-party decision information associated with the decision on the disputed information. Third-party) decision information may include data elements associated with a third-party analysis of the disputed information. In one embodiment, third-party) decision information may be input received via a graphical user interface associated with the third-party computing device 132 (as illustrated in FIG. 1) and also as illustrated in FIG. 9. In other embodiments, the third-party decision information may be received from other information sources and methods without having received data via a graphical user interface. For example, the third-party decision information may be received without displaying a graphical information when the apparatus, code, methods and systems of the present invention are configured to integrate with third-party databases or automated systems and algorithms. The third-party decision information may include data the disputed information, third-party contract outcome, and third-party analysis for the disputed information. Third-party outcome includes the third-party determination of the outcome of the contract based upon a triggering event, protocols associated with the contract and the analysis conducted by the third-party. The third-party decision information may include data elements that reflect whether the third-party outcome agrees or disagrees with the proposed outcome of the disputed information. For example, if the disputed information in the example above includes data elements that the contract outcome does not equal X, then third-party decision information may include a third-party analysis or logic for why the contract outcome does or does not equals X, does or does not agree with the proposed outcome information of the disputed information, that the contract outcome equals Y, or the information that includes data elements that the third-party decision information partially agrees with proposed outcome. By way of another example, if the disputed information includes data elements disputing the outcome of a wager, then the third-party decision information may include a third-party analysis or logic why the third-party decision information agrees or disagrees with the disputed information, or partially disagrees or agrees with the information. The third-party disputed information may also include data elements suggesting various changes and amendments to the underlying agreements associated with the contract.

Figures 7A, 7B:
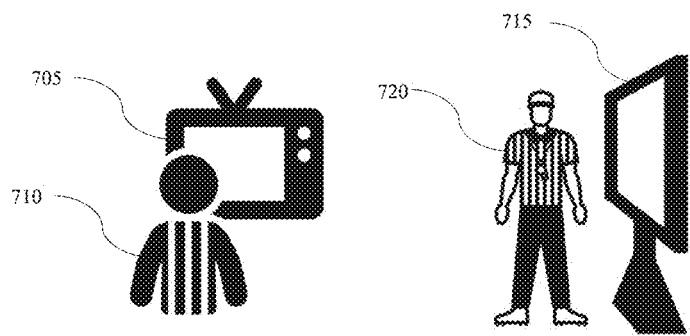
FIG. 7A is a graphical representation of a referee conducting an analysis, according to an example embodiment.
FIG. 7B is a second graphical representations of a referee conducting an analysis, according to an example embodiment.

The database may also be configured to store status information. In one embodiment, the status information is configured to display on the first or second graphical user interface graphical representations or a first graphical representation. Status information may be defined as information regarding the status of pending disputed information prior to the first or second user receiving their verified outcome associated with disputed information. In other embodiments, status information may include data elements for displaying graphical representations including an informative experience displaying the disputed information relative to the verified contract outcome. In certain embodiments, the informative experience may be an entertaining experience for the user that may be used to keep user engaged with the user interface. The informative experience may include a graphical representation of a referee reviewing a play or call associated with the real-time event. In certain embodiments, the graphical representation may include a referee reviewing a play or call not associated or disparate with a real-time event (as illustrated in FIGS. 7A and 7B). The informative experience or entertaining experience is intended to provide a sense of anticipation to the first and second user so that the first or second user remains engaged with the user interface before the consensus contract outcome is determined. Keeping the use engaged with the interface is beneficial because it allows for advertising and other promotional materials to be displayed to the user.

Figure 8A:
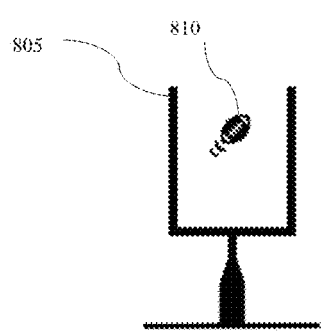
FIG. 8A is a graphical representation of an outcome relative to a user position, according to an example embodiment.
Figure 8B:
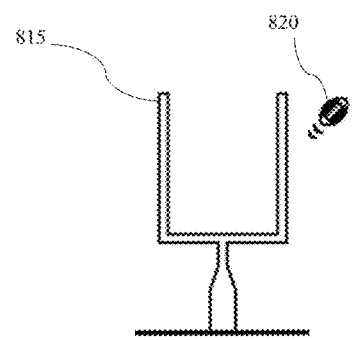
FIG. 8B is a graphical representation of a second outcome relative to a user position, according to an example embodiment.

FIGS. 7A and 7B are examples of a graphical representation of a referee conducting an analysis, which gives the user an entertaining experience, according to an example embodiment. FIGS. 7A and 7B illustrate a referee 710, 720 viewing replay screens 707, 715. Such graphical representations are displayed on at least one of user interfaces of the first computing device and the second computing device so that the first user or second user may view the graphical representation of the referee before the consensus contract outcome is determined. The graphical representation of the referee, which in certain embodiments may not be associated with the subject matter of the contract, is intended to provide excitement to both the first user and second user while waiting on the consensus contract outcome. In other embodiments, the informative experience may include a graphical representation of the amount of time remaining before the user receives the verified contract outcome. In other embodiments the graphical representation may include display elements displaying which of the third-parties have either agreed or disagreed with the disputed information and may include a graphical representation of sporting events (football games, boxing matches, soccer matches, basketball tournaments, etc.), and the like illustrating the increasing probability that the consensus contract outcome will align with a user's or third party's position (further explained below). In other embodiments, the graphical representation may include a controversial action associated with a real-time event. For example, in one embodiment, the controversial action may be a replay of controversial play or infamous associated with a sporting event related to a wager that is being disputed by the user. FIGS. 8A and 8B also illustrate examples of entertaining experiences that may be provided or displayed to the interfaces of the computing devices associated with the system.

The database may also be configured to store consensus contract outcome information associated with the contract outcome. The apparatus, code, methods, and systems are configured for determining a consensus contract outcome based upon third-party decision information received. The consensus contract outcome is derived from a threshold of third-party decision information being in agreement with each other. Consensus contract outcome information may include data elements including the threshold number, third-party decision information from each third-party, time relative to when the consensus contract outcome was calculated, times relative to the third-party decision information etc. The threshold may be adjustable. In one embodiment, the threshold number may be a simple majority vote, a three fourths majority, a vast majority etc. In certain embodiments, the consensus information may be based on a portion or entirety of each of the third-party) decision information. Additionally, other embodiments and algorithms may be used for determining a consensus contract outcome information. The consensus contract outcome information may also include information for displaying data associated with the consensus contract outcome information related to the verified contract outcome on the graphical user interface of either the first computing device 112, second computing device 122 and third computing device 132.

For example, the FIGS. 8A and 8B illustrate entertaining experiences of the consensus contract outcome relative to the position of either the first user or second user to either the first user interface or the second user interface. One feature of the present invention is that it allows social wagering, or the pairing of two people together and is therefore the most direct exemplification of where Blockchain can decentralize 'the house'. The present invention provides a way to decentralize the decision-maker and gatekeeper for social wagering. Users may think to themselves, "Can I beat someone else at this game?", "Will Bitcoin go up today?", "Will oil go down next month?", "Will it rain tomorrow?" Will Donald Trump win re-election?", "Will team A beat team B?" One aspect of the present invention is that it allows for numerous third-parties for providing third-party decision information. As a result, the present invention can analyze such decentralized third-party decision information to provide a consensus contract outcome information related to a contract outcome for almost any type of wager or smart contact. Additionally, another aspect of the present invention is that it may be used for decentralizing decision-making processes related to disputed information, such as disputed information related to insurance policies, agreements between parties, rise and fall of commodities etc. Another aspect of the present invention is that provides a proof of trust protocol (POT), proof and trust protocol (PAT), or proof that the transaction may be trusted.

The consensus contract outcome information may be configured such that the includes data elements for providing or displaying an informative experience relative to the consensus contract outcome information or the third-party decision information received from the third-parties before the consensus contact outcome is determined. In certain embodiments, the informative experience may be an entertaining experience for the user and may also be displayed to the computing device used by the third party). For example, in one embodiment the informative experience or entertaining experience may be a referee signaling a score, goal or touchdown, a missed goal, missed goal or field goal displayed on the graphical user interface of the remote computing device of the user. For example, if a user disputes the contract outcome, and the consensus contract outcome information associated with the consensus contract outcome confirms that the user was correct and that the contract outcome was not correct, then an entertaining experience of a person scoring a goal or kicking a field goal through the uprights (see FIG. 8A) may be displayed on that user's interface. On the other hand, if a user disputes the contract outcome, and the consensus contract outcome information associated with the consensus contract outcome confirms that the user was not correct consensus contract outcome confirms the contract outcome, then an entertaining experience of a person missing a goal or missing the field goal's uprights (FIG. 8B) may be displayed on that user's interface. Additionally, the informative experience may also include graphical representation of the data associated with disputed information versus the consensus contract outcome information. In one embodiment the entertaining experience may be associated with the subject matter of the contract and in other embodiments the entertaining experience may be not associated or disparate with the subject matter of the contract.

FIGS. 8A and 8B illustrate a graphical representation of an entertaining experience for the consensus contract outcome relative to a user position, according to an example embodiment. FIGS. 8A and 8B illustrate an entertaining and informative experience that may be used to entertain and inform the first user and second user if the the consensus contract outcome information differs, is the same as the first user position or the second user position, or that may be used before the consensus contract outcome has been determined. For example, if a first user disputes the contract outcome associated with an insurance policy and, based upon the third-party decision information received, the consensus contract outcome confirms that the first user's position was correct, then the entertaining experience of a football 810 entering between the vertical uprights 805 may be used to signify that the first user's position was correct (as illustrated in FIG. 8A). Similarly, if a first user disputes the contract outcome associated with an insurance policy and, based upon the third-party decision information received, the consensus contract outcome confirms that the first user's position was not correct, then the entertaining experience of a football 820 not entering between the vertical uprights 815 may be used to signify that the first user's position was not correct. Additionally, other entertaining experiences may be used such as roulette wheel, slot machines, or other real-time entertaining experiences such as a soccer game win which one team scores or misses a goal each time the first user or second user correctly or incorrectly disputes a contract outcome. However, other entertaining experiences may be used that are also within the spirit and scope of the present invention. The subject matter of the entertaining experience may or may not be related to the subject matter of the underlying contract.

In certain embodiments, the system is configured for displaying, on the user interfaces of the remote devices associated with the system, each of the third-party determinations of each of the third-parties relative to the consensus contract outcome, as entertaining experiences. The entertaining experiences related to each of the third-party determinations may be displayed to one or more users, including third-party users, on their respective computing devices, on computing devices viewed by multiple users, and the like. Exemplary displays include a virtual roulette wheel, a virtual slots machine, a sporting competition, portions of a sporting competition, racing and the like (like or related to non-limiting embodiments illustrated in FIGS. 8A and 8B). These displays can also be used as an interface to allow users to input disputed information associated with the contract outcome. The positions of each user are preferably compared with the third-party decision information regarding the contract. Before the consensus contract outcome is determined, which may have any suitable duration, the results of the comparisons between the feed of third-party determinations and the positions of the different users can be displayed in real-time to provide the users with their current standings relative to each other user or relative to the what could be the consensus contract outcome. The duration of time for the consensus contact outcome to be determined and received may vary greatly, with exemplary durations being based on set periods of time, or any other duration.

By way of another example, a user disagrees with the decision of an insurance company regarding a contract provision of an insurance policy. Said user provides disputed information related to policy coverage of an insurance policy. Let's also assume that as time progresses, an increasing amount of third-party determinations agree with said user that the contract outcome is not correct. As such third-party determinations are received, a graphical representation having an entertaining experience may be displayed, such as a graphical representation of sporting events (football games, boxing matches, soccer matches, basketball tournaments, etc.), and the like illustrating the increasing probability that the consensus contract outcome will align with said user's position. On the other hand, as time progresses, if an increasing amount of third-party determinations disagree with said user that the contract outcome is not correct, then a graphical representation having an entertaining experience may be displayed, such as a graphical representation of sporting events (football games, boxing matches, soccer matches, basketball tournaments, etc.), and the like illustrating the decreasing probability that the consensus contract outcome will align with said user's position related to the disputed information input by the user.

The database may also be configured to store third-party rating information associated with a rating or ranking of each third-party. Third-party rating information may be stored in each third-party record wherein each third-party record may be created and stored in the database. The third-party rating information may be defined as and include data elements for a ranking or rating of the third-party, penalty information related to third-party decision information not matching the consensus contract outcome information or parts thereof, benefit information related to third-party decision information corresponding to the consensus contract outcome or verified contract outcome or parts thereof.

Third-party reward information may be a reward, benefit or incentive for the third-party and may include data elements associated the third-party reward received by the third-party based upon the third-party decision information and may include the penalty information and benefit information related to each third-party decision. The third-party reward information to be stored in each third-party record.

In one embodiment, if contract outcome information is contested or disputed and the third-party decision information is confirmed as correct or matching portions or the entirety of the consensus contract outcome information, then data elements reflecting a reward or benefit may be included or added to the third-party rating information thereby increasing the ranking or rating of the third-party, which may also be reflected in the third-party reward information. In certain embodiments, the benefit may be that the rating is not decreased. In one embodiment, the third-party rating information may correspond to an amount of monetary compensation received by each third-party. In other embodiments, the third-party rating information may correspond to a non-monetary compensation received by the third-party. In certain embodiments, the third-party rating information that corresponds to the order in which each third-party receives the disputed information.

The third-party reward information may also include a graphical representation related to each third-party decision information. In one embodiment, the graphical representation may include an informative experience. In one embodiment, the informative experience may be an entertaining experience, such as the stacking of coins, funny videos, countdown timer so that the third-party can make selfcompetition and compete against others. In one embodiment, the code, systems and methods are configured providing, over the communications network, to the third graphical user interface a third graphical representation related to a third-party reward. The third-party reward may include an information and/or entertaining experience.

FIGS. 10A-10D are examples of graphical representations of user rewards. The subject matter of the entertaining experience of the graphical representation related to the third-party reward may or may not be related to the subject matter of the underlying contract or the subject matter of the reward given. For example, the graphical representation 1005 in FIG. 10A may be a trophy or some other items. By way of another example, the graphical representation 1010 in FIG. 10B may be a trophy resembling the user. By way of another example, the graphical representation 1015 in FIG. 10C may be a group of people hoisting a person representing the third-party. By way of another example, the graphical representation 1020 in FIG. 10C may be a graphical representation of a person standing on a person representing the third-party. The database may also be configured to store the verified contract outcome information associated with each of the verified contract outcomes associated with contract contracts and disputed contracts.

In one embodiment, the verified contract outcome includes the consensus contract outcome information of the consensus contract outcome if the contract outcome was disputed and may also include the contract outcome if the contract outcome was not disputed. By way of another example, if contract outcome information is contested or disputed and the third-party) decision information is found to be incorrect or not matching portions of the entirety of the consensus contract outcome information, then data elements reflecting a penalty may be included or added to the third-party rating information thereby decreasing or degrading the ranking or rating third-party.

FIG. 1 shows an embodiment of the present invention wherein networked computing devices 112, 122, 132 and network 130, application 170 interact with server 102 and repository 104 (it should be noted that the third-party network may include numerous third-parties having multiple devices) over the network 106 and blockchain 160. Server 102 includes a software engine that delivers applications, data, program code and other information to networked computing devices 112, 122, 132 and third-party network 130. It should be noted that although FIG. 1 shows only the networked computers 102, 112, 120, 122, 130, 132, the system of the disclosed embodiments supports any number of networked computing devices connected via network 106. Further, server 102, networked computers and systems 102, 112, 120, 122, 130, 132 and application 170 includes program logic such as computer programs, mobile applications, executable files or computer instructions (including computer source code, scripting language code or interpreted language code that may be compiled to produce an executable file or that may be interpreted at run-time) that perform various functions of the disclosed embodiments.

Note that although server 102 is shown as a single and independent entity, in one embodiment, the functions of server 102 may be integrated with another entity, such as one of the devices 112, 120, 122, 132, payment authority or social network. Further, server 102 and its functionality, according to a preferred embodiment, can be realized in a centralized fashion in one computer system or in a decentralized distributed fashion wherein different elements are spread across several interconnected computer systems.

FIG. 1 illustrates that the first user 110 may be associated with the remote computing device 112 and the second user 120 may be associated with remote computing device 122. Information and data may be transmitted to and from the devices 112, 122. Information or data may be displayed on the graphical user interfaces associated with each remote computing device. Additionally, a user may select an icon or other graphical representation on the display by interfacing with screen with a swipe or swiping gesture, push or other means of indicating a user preference. The graphic user interfaces may be configured for displaying information and receiving input from users and are well known to those skilled in the art.

As briefly mentioned above, each third-party 131 associated with the third-party network 130 may also be associated with a remote computing device 130. Information and data may be transmitted to and from the devices 132. Information or data may be displayed on the graphical user interfaces associated with each remote computing device 132. Additionally, a user may select an icon or other graphical representation on the display by interfacing with screen with a swipe or swiping gesture, push or other means of indicating a user preference. The graphic user interfaces may be configured for displaying information and receiving input from users and are well known to those skilled in the art.

FIG. 1 may also include a fourth-party application 170. In one embodiment, the forth-party application represents a software application or system configured to allow first user 110 and second user 112 to form a Smart Contract with each other. As mentioned above, the forth party application may be configured for sending or receiving information related to the contracts related to the first user and second user to the system. In one embodiment of the present invention, the forth-party may include a payment gateway, which is an e-commerce Application Service Provider (ASP) service that authorizes and processes payments from one party to another.

Figure 2:
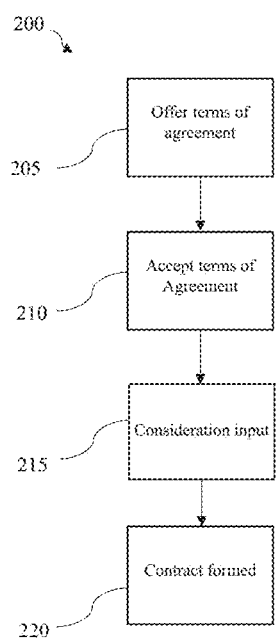
FIG. 2 is a block diagram showing the data flow pertaining to the first and second user entering into a smart contract for the apparatus, code, methods, and systems for confirming, modifying, causing to be performed and recording outcome related to contracts between a first user and a second user, according to an example embodiment.

FIG. 2 is a block diagram showing the process 200 pertaining to the users entering into a smart contract for the apparatus, code, methods, and systems for confirming, modifying, causing to be performed and recording outcome related to contracts between a first user and a second user, according to an example embodiment. This process can take place on a fourth party application 170 that is in communication with the communications network. In operation, in step 205, a first user 120 would make an offer for entering into an agreement. As mentioned above, the terms of the offer may include an offer and to enter into a contract for goods, services, insurance, to pay a debt, to borrower loan money, and a wager, peer to peer competition, contract for land, etc. It is understood that other types of contracts may also be entered. The fourth party application may be configured such that the first user 110 may input data related to the terms of the agreement via the graphical user interface of the computing device 112. Next, the data related to the terms of the offer to enter the terms of the agreement may be transmitted over the network to the second user.

Next, in step 210, the second user may view the terms of the contract proposed by the first party on the remote computing device 122 of the second user. In operation, the second user may accept the terms of the contract by entering data or input into the graphical user interface of the device 122 of the second user. Additionally, in certain embodiments, the second user may provide a counter offer to the first user's offer by entering input into the graphical user interface of the device second user. If the second user accepts the offer of the first user, then data related to acceptance of the offer will be transmitted over the communications network to the first user. On the other hand, if the second user, provides a counter offer to be first party's offer, then the counteroffer will be provided to the first user for acceptance, rejection or counteroffer. This process will continue until all terms of the agreement had been agreed to by both the first and second party. As mentioned above, the fourth party application be configured for facilitating the first user and second user entering contract.

Next, in step 215, either the first, second, or first and second user may provide consideration to enter into the contract. In one embodiment, if the consideration is payment of money from either the first or second user, then the fourth party application 170 may provide a display to the graphical user interface of either the first or second user's device so that either the first or second user may input their payment information. In certain embodiments, in step 215, for certain contracts were payment is required, the fourth party application may require that the electronic payment information must be received by either the first or second user for the contract to be performed. In one embodiment, electronic payment information may comprise identifying information and any data garnered from a purchase card (i.e., purchase card data), as well as any authentication information that accompanies the purchase card. Purchase card data may comprise any data garnered from a purchase card and any authentication information that accompanies the purchase card. In one embodiment, electronic payment information may comprise user login data, such as a login name and password, or authentication information, which is used to access an account that is used to make a payment. The fourth party application may include a payment authority that may accept payment via the use of purchase cards i.e., credit cards, charge cards, bank cards, gift cards, account cards. EFT payment, wire transfers, cryptocurrency, such as Icash®. After payment is been received, in step 220, a contract has been formed. As mentioned above, the contract is intended to be a Smart Contract.

Figure 3:
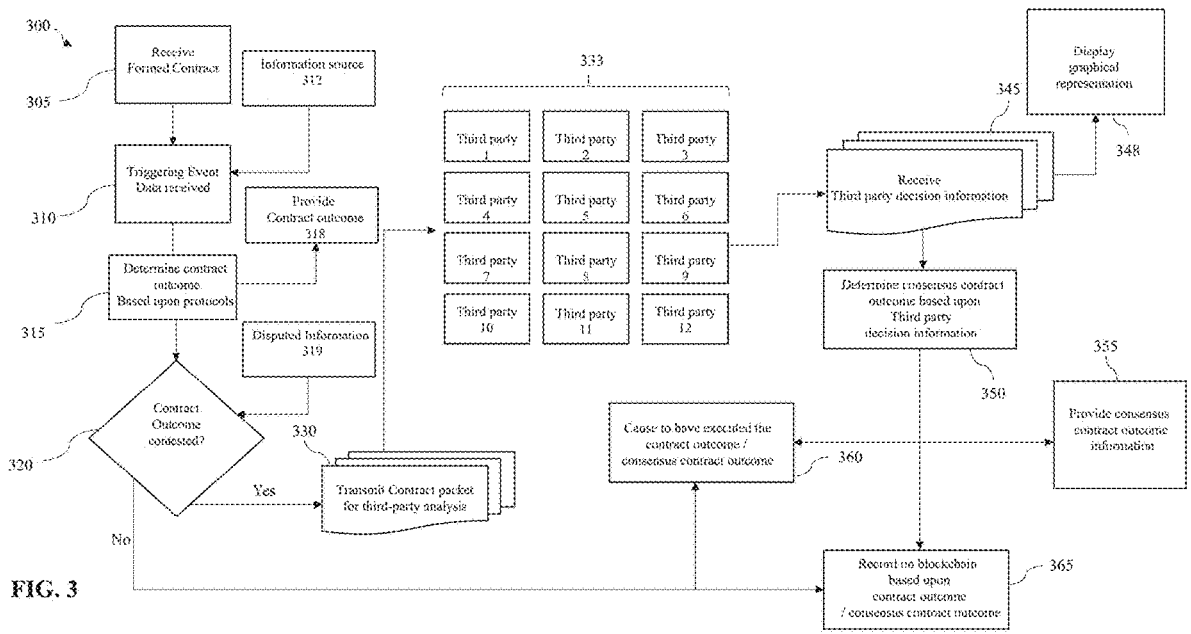
FIG. 3 is a block diagram showing the process flow pertaining to reviewing disputed information of the contract for the apparatus, code, methods, and systems for confirming, modifying, causing to be performed and recording outcome related to contracts between a first user and a second user, according to an example embodiment.

FIG. 3 is a block diagram showing the process flow 300 pertaining to reviewing disputed information of the contract for the apparatus, code, methods, and systems for confirming, modifying, causing to be performed and recording outcome related to contracts between a first user and a second user, according to an example embodiment. The system is configured for receiving over the communications network, for each contract for between the first and second user, contract protocols associated with a triggering event intended to occur in the future. In one embodiment, in step 305, the contract between the first and second users may be transmitted and received from the fourth party application 170. In other embodiments, the contract information is not received until either the first or second user disputes the contract outcome.

Next, a triggering event that was scheduled to occur in the future occurs. As a result, the system may be configured for receiving the triggering event data from a variety of information sources 312, including the fourth party application 170. As mentioned above, the triggering event may be related to a commodity or security, a sporting event, an action by a performing party, a non-performance by a performing party, etc. For example, a contract may include data elements to determine if a triggering event occurred such as performance of an action A by a performing party B at a specific time C has occurred. If the action A was performed by the performing party B at a specific time C, then contract protocols may dictate that the contract outcome=X. On the other hand, if the action A was performed by a performing party B at a specific time C, then the contract protocols may dictate that the contract outcome=Y. As mentioned above, the subject matter associated with a contract may include a contract for services, contract for goods, a blockchain transaction, insurances policies, a contract for land, a contract for non-performance, and a wager or competition, wherein each user has a competitive position regarding a real time event or an outcome of a real time event.

Using one of the examples above, the triggering event may be if sports team A wins or loses a certain sporting event. In such an example, the contract protocols may be such that if the sports team A wins, then the first user shall pay a certain amount to the second user and if sports team A loses, then the second user shall pay a certain amount to the first user. Let us assume that in such an example sports team A wins the certain sporting event. The triggering event information associated with the certain sporting event or real-time event may be transmitted from the fourth party application or another information source to the system. In other embodiments, the triggering information associated with the certain sporting event may be received from a plurality of other information sources 312 and data sources, such as ESPN™ etc. Such information and data sources may be websites, databases, data input via remote computing devices, auditors, television news feeds, almanacs, social media, first user computing device, second user computing device, the fourth party application as well as many other ways for determining if a triggering event has occurred.

Next, in step 315, based upon the contract protocols embedded in the smart contract, the system may be configured to determine a contract outcome and associated contract outcome information. In one embodiment, the system may be configured, in step 318, to provide the contract outcome to the user interfaces of the first computing device 112 and second computing device 122 so that the first and second users may view the contract outcome to determine if they desire to dispute the contact outcome. However, in other embodiments, the fourth party application be configured for determining the contract outcome and associated contract outcome information. In such embodiments where the fourth party application also determines the contract outcome, the fourth party application may also be configured for providing contract outcome information to the user interfaces of the first computing device 112 and second computing device in the 122 so that the first and second users may view the contract outcome.

Using the contract between the first and second users related to the sporting event example above, the system may be configured for using the contract protocols to determine the contract outcome based upon the triggering event information about the certain sporting event or real-time event. The contract protocols may include a first competitive position for the first user associated with the sporting event or real-time event, a mutually exclusive second competitive position for the second user associated with a sporting event or real-time event wherein the first and second competitive positions may include odds or other protocols for payment of the wager. As mentioned above, the fourth party application may also be configured for determining the contract outcome information, such as an insurance policy coverage.

In the example above where sports team A loses, the protocols require that the first user was required to pay the second user a certain amount. After the contract outcome has been determined, then the system is configured for providing a predetermined amount of time to wait before recording the transaction of the block chain. The predetermined amount of time for allowing the contract outcome to be contested may be varied depending on the application, the contracts, the first and second users, as well as other factors.

Next, in step 320, the system is configured for determining if the contract outcome has been contested. As mentioned above, the system is configured for receiving, over the communications network, within the predetermined amount of time after the triggering event information has been received, disputed information associated with the contract outcome from either the first or second user computing devices 112, 122, respectively. In the present embodiment, the system may be configured for receiving disputed information from the fourth party application. In other embodiments, the system may be configured for receiving disputed information directly from the first user device or second user device.

Next, if no disputed information is received within the predetermined amount of time, then the process moves to process 360 and 365. In step 360, the system is configured such that it causes the contract to be performed such that the verified contract outcome corresponds with the contract outcome. In one embodiment, the system is configured for providing instructions or protocols to the fourth party application to execute the payment instructions. In one embodiment, the system is configured to provide data elements that block or allow payments to be made or other protocols to be executed. Referring back to the example above, where sports team A wins the certain sporting event requiring that the first user pay the second user certain amounts, then then the system may transmit an instruction or data elements to the fourth party application, escrow entity, bank, or other payment authority, to execute the contract protocols and transmit payment to the second user. In step 365, the system is configured for recording or having the contract outcome information mined onto a distributed ledger of the block chain (which is further explained below and illustrated in FIG. 4) or another public ledger. It is understood that recording of the transaction is defined to mean having the contact outcome information mined by a decentralized network to the block chain and in other embodiments recording of the transaction may be defined as allowing that a decentralized server records the transaction to the block chain.

On the other hand, if disputed information is received by the system provided by either the fourth party application, the first user remote computing device, or the second user remote computing device within the predetermined amount of time, then the process moves to step 330. In step 330, if disputed information is received by the system from either the first user computing device or second user computing device directly or through the fourth party application, then the system transmits a packet of data to each of the plurality of third-parties 333. As mentioned above, the disputed information includes data and information that the disputing party (first user or second user) is disputing based upon the contract outcome for the contract. The disputed information may also include information related to what the disputing party (first user or second user) believes to be the proposed contract outcome. As mentioned above, the disputed information may include data elements disputing the following: the triggering element, triggering element date, triggering element time, subject matter of the triggering element, portions of the triggering elements, contract outcome, the proposed outcome, logic why the contract outcome is disputed, portions of the proposed outcome etc. Additionally, other data may also be disputed and is within the spirit and scope of the present invention.

Upon receiving the disputed information, each of the third-parties will conduct a third-party analysis of the disputed information to determine the outcome of the disputed contract. As mentioned above, in one embodiment, the third-party may be inputting data and receiving data via a remote computing device 132. In one embodiment, the apparatus, code, methods, and systems are further configured to provide graphical representations to a graphical user interface of the third-party computing device so that the third-party may view the disputed information. The graphical user interface may be configured for receiving the third-party decision information 345. In one embodiment, the third-party information comprises data elements or code related to if the third-party agrees, disagrees or partially agrees or partially disagrees with the disputed information. In other embodiments, the third-party decision information may include data input inform at least a gesture or other input data from the third-party for at least one of agreeing and disagreeing with the disputed information. Additionally, the gesture or other input data may also be configured to provide partial agreement and partial disagreement with the disputed information. For example, FIG. 9 illustrates a computing device 901 having a graphical interface 905 having icons 910 for a third-party to either accept or deny a transaction. In other embodiments, the disputed information may be provided to a third-party that are systems or applications configured for using algorithms and other logic for determining an outcome of the disputed information.

While the each of the third-parties is analyzing the disputed information, in step 348, the system may be configured for providing status information to the graphical user interfaces of either the first party computing device 112 or second-party computing device 122. The status information is configured to display on the first or second graphical user interface a first graphical representation related to a status of the disputed information. The status information may provide a first informative experience or entertaining experience. In one embodiment, the first informative experience may be configured for displaying the disputed information relative to a subject matter associated with the contract (such as illustrated in FIG. 7A-8B). In one embodiment, the informative or entertaining experience may be associated or not associated with the subject matter of the underlying contact or disputed information.

As mentioned above, before the consensus contract outcome is determined, which may have any suitable duration, the results of the comparisons between the live feed and the positions of the different users can be displayed in real-time to provide the users with their current standings relative to each other user or relative to the what could be the consensus contract outcome. The duration of time for the consensus contact outcome to be determined and received may vary greatly, with exemplary durations being based on set periods of time, or any other duration.

By way of an example, a user provides disputed information related to policy coverage of an insurance policy. Then, in step 345, assuming an increasing amount of third-party determinations is received from the feed that agree with said user that the contract outcome is not correct, then in step 348 a graphical representation having an entertaining experience may be displayed, such as a graphical representation of sporting events (football games, boxing matches, soccer matches, basketball tournaments, etc.), and the like illustrating the increasing probability that the consensus contract outcome will align with said user's position. Examples of such sporting events illustrated in FIG. 8A-8B. By way of another example, assuming in step 345 an increasing amount of third-party determinations is received that agree with the position of the user, an increasing probability that the consensus contract outcome will align with said user's position may be displayed in step 348 as a boxer beginning to overcome his opponent. By way of another example, in step 345 assuming an increasing amount of third-party determinations is received that agree with the position of the user, then an increasing probability that the consensus contract outcome will align with said user's position may be displayed in step 348 as an American football player catching a long pass or scoring a touchdown. By way of another example, in step 345 assuming a decreasing amount of third-party determinations is received, then a decreasing probability that the consensus contract outcome will align with said user's position may be displayed in step 348 as the quarterback of an American football player throwing an interception or a missing a tackle. As the feed of third-party determinations is received, the graphical representation of an entertaining experience displayed may be updated so that the victor of the entertaining experience corresponds with the consensus contract outcome that aligns with the user position that selected the correct outcome. For example, if a first user's contract position aligns with the consensus contract outcome, then the victor of the entertaining experience (the winner of the football game, boxing match, race etc.) will be such that the first user's entertaining experience reflects that the first user won the competition. Alternatively, if a first user's contract position does not align with the consensus contract outcome, then the victor of the entertaining experience (the winner of the football game, boxing match, race etc.) will be such that the first user's entertaining experience reflects that the first user lost the competition.

FIG. 3 illustrates numerous third-parties 333 that may be configured for analyzing the disputed information so that each third-party may transmit a third-party decision the system. In one embodiment, the apparatus, code, methods, and systems of the present inventions are further configured for assigning a rating to each third-party (further explained below and further illustrated in FIG. 5). In one embodiment, the apparatus, code, methods, and systems are configured for transmitting, over the communications network, disputed information to the third-parties in a predetermined order corresponding to the rating of each third-party. FIG. 3 illustrates that in the present embodiment, twelve separates third-parties or third-party systems are configured to receive the disputed information when the system receives information related to a disputed contract. For example, in FIG. 3, the third-party labeled one may have the highest rating and the rating may decrease as the number increases (for example third-party labeled 2 may have the second highest rating, the third-party labeled 3 may have the third highest rating, and so on). In the present embodiment, each of the third-parties are assigned a number associated with their rating corresponding to the predetermined order in which the system transmits information to the third-party. However, it is understood that other systems for rating may also be used and are within the spirit and scope present invention. Each of the third-parties are incentivized to retain a high rating by providing data that is correct. Additionally, each of the third-party ratings may be reduced if a third-party provides data that is incorrect. It is crucial to note that all third-parties will function independently with no direct correlation to users of the application or the Blockchain protocol that Smart Contracts are being propagated on.

In step 345, the system receives, over the communications network, third-party decision information associated with the disputed information from each third-party that performed the third-party analysis of the disputed information. The third-party decision information may be input by a third-party via the graphical user interface of the third-party computing device. In other embodiments, the third-party decision information may be received via data elements or other code.

Next, in step 350, the apparatus, code, methods, and systems determine a consensus contract outcome based upon third-party decision information received. The consensus contract outcome comprises a threshold of third-party decision information agreeing or matching. In one embodiment, the threshold is at least a 50% match of third-party decision information from each third-party. In other embodiments, the threshold is at a least 75% match of third-party decision information each third-party. However, other thresholds may be used and are within the spirit and scope of the present invention. One of the benefits of the current invention is that it allows a decentralized network of third-parties acting independently of one another for making decisions. The threshold allows the system to determine the level of confidence or trust of the third-party decisions. As a result, the inefficiencies and discrepancies of the "house" or decision-makers is greatly reduced.

Using one of the examples above, the triggering event may be if sports team A wins or loses a certain sporting event. In such an example, the contract protocols may be such that if the sports team A wins, then the first user shall pay a certain amount to the second user and is sports team A loses, then the second user shall pay a certain amount to the first user. The protocols may also include a first competitive composition or odds related to the sporting event associated with the first user and a second competitive position or odds related to the real-time event or sporting event associated with the second user. Let us also assume in such an example sports team A in real-time wins the certain sporting event or real-life event. The triggering event information associated with the certain sporting event may be transmitted from the fourth party application to the system. In other embodiments, the triggering information associated with the certain sporting event may be received from a plurality of other information sources and data sources. Additionally, the system of the present invention may also be configured for receiving the triggering event information and protocols associated with the sporting events before the triggering event occurs. In such an example, the system may also be configured for determining the contract outcome information via a plurality of other information sources.

In the current example while the sports team won the real-life event, the fourth party application or the system incorrectly provides information that states that the contract outcome information associated with the event was that the sports team A lost the event. In such an example, the fourth party application provided a contract outcome stating that the second user lost the wager. In operation, if the fourth party application provided in incorrect contract outcome information, then, as illustrated in step 319, the second user could enter input data into the second user computing device disputing the contract outcome and providing a proposed outcome, which would be received by the system in step 320. The disputed information may be input into the system using the graphical interface of the remote computing devices of the users. Next, in step 330 the system would transmit the disputed information associated with the contract to the third-parties for analysis by the decentralized network of third-parties 333. Next, in step 345 and 348, before the consensus contract outcome has been determined, the system could provide status information regarding the disputed information to the first and second users the other remote computing devices (as explained above). The status information may include graphical representations having entertaining experiences such as virtual roulette wheel, a virtual slots machine, a sporting competition, portions of a sporting competition, racing and the like (such as illustrated in FIG. 8A-8B). Next, after the consensus contract outcome based upon the third-party decision information has been determined, in step 355, the system is configured for providing consensus contract outcome information to the graphical user interfaces of either the first user computing device 112 and second user computing device 122. The consensus contract outcome information is configured to display on the first and second graphical user interfaces a graphical representation related to the consensus contract outcome. The graphical representation related to the consensus contract outcome may include a second informative experience displaying the disputed information relative to the consensus contract outcome information. The graphic representations related to the consensus contract outcome is further explained above and illustrated in FIGS. 8A and 8B. It is understood that graphical representations displayed on the first and second graphical user interfaces may also be displayed on the user interfaces associated with the third-parties.

Next, in step 360 the apparatus, code, methods and system are further configured for causing the contract to be performed such that the verified contract outcome corresponds with the consensus contract outcome. In one embodiment, the payment held in escrow may be cryptic currency. The system may provide instructions to the fourth party) applications to execute payment and remit payments basic on the protocols associated with the consensus contract outcome information. Next, in step 365, the system is configured for allowing the consensus contract outcome information to be mined onto or recorded on a distributed ledger or block chain.

Figure 4:
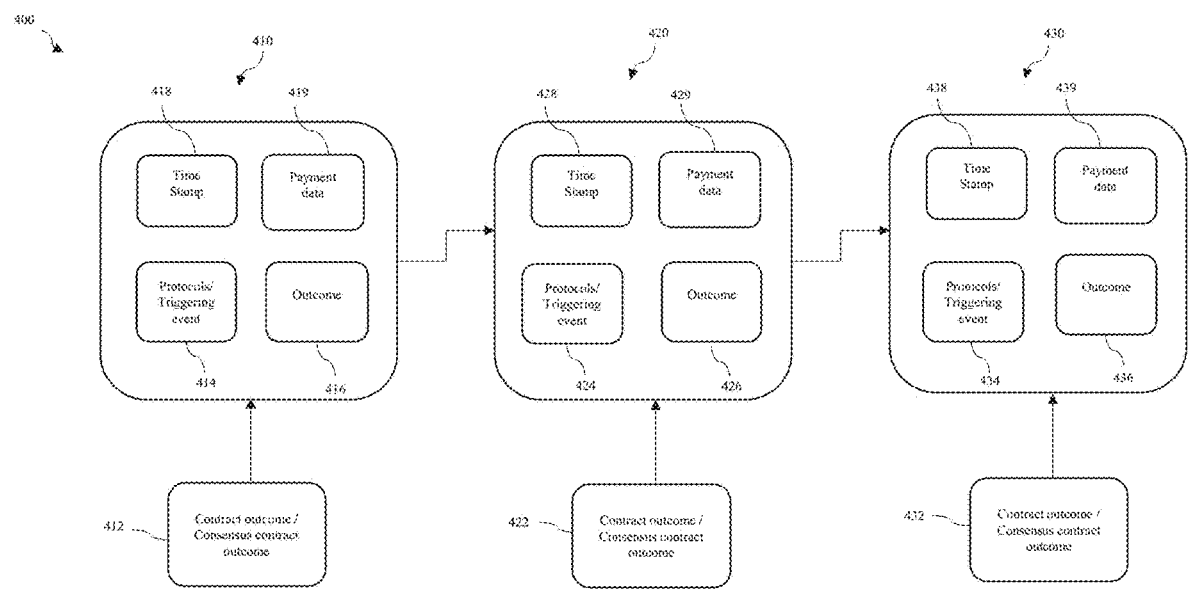
FIG. 4 is a block diagram of the blockchain formation pertaining to reviewing disputed information of the contract for the apparatus, code, methods, and systems for confirming, modifying, causing to be performed and recording outcome related to contracts between a first user and a second user, according to an example embodiment.

FIG. 4 is a block diagram of the blockchain formation 405 pertaining to reviewing disputed information of the contract for the apparatus, code, methods, and systems for confirming, modifying, causing to be performed and recording outcomes and providing proof of trust related to contracts between a first user and a second user, according to an example embodiment. FIG. 4 is a series of transactions that have been recorded or minded on the block chain 160. Each of the recorded transactions include a block 410, 420, 430 having data that has been verified by the system this mined on the block chain. Each block of the block chain may include a timestamp 418, 428, 438 associated with the recorded transaction. Additionally, each block may also include the protocols and triggering event 414, 424, 434 associated with the recorded transaction. Additionally, each block may also include the outcome 416, 426, 436 (contract outcome/consensus contract outcome) associated with the recorded transaction. Additionally, each of the blocks may also include the payment data associated with the transaction. The payment data may include a transfer of consideration between the first user and second user and may include cryptocurrency in other payments methods.

Figure 5:
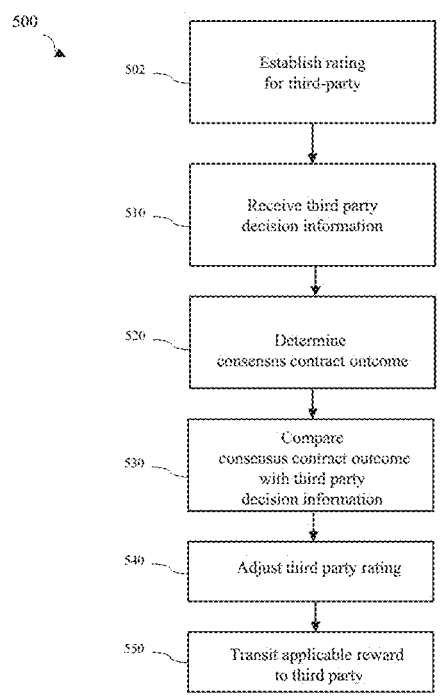
FIG. 5 is a block diagram showing the process flow pertaining adjusting the rating for each third-party for the apparatus, code, methods, and systems for confirming, modifying, causing to be performed and recording outcome related to contracts between a first user and a second user, according to an example embodiment.

Referring to FIG. 5. FIG. 5 is a block diagram showing the process flow 500 pertaining to how adjustment of the rating for each third-party for the apparatus, code, methods, and systems for confirming, modifying, causing to be performed and recording outcome related to contracts between a first user and a second user, according to an example embodiment. In step 502, a baseline rating is assigned to each third-party configured for receiving disputed information. The baseline rating may be stored in each of the third-party records. The baseline rating may be adjusted depending on an application. The baseline reading may be adjusted depending on the type third-party, however in other embodiments other systems for assigning ratings may be used that are within the spirit and scope of the present invention. In one embodiment, the baseline rating of the third-party receives a penalty or will be affected in a negative manner if its corresponding third-party decision information does not match or partially match the consensus contract outcome and associated consensus contract outcome information (further explained below and in FIGS. 6A and 6B). In one embodiment the baseline rating of the third-party may be configured to be increased in a positive manner if the third-party decision information matches the or partially matches the consensus contract outcome associated with the consensus contract outcome information. In one embodiment, the system may also determine how much of a penalty, reduction or negative effect to the baseline rating will be recorded in the third-party record based upon the deviation from the consensus contract outcome. Similarly, in one embodiment the system may also determine how much of a reward or benefit or positive element may be added to the third-party rating for third-party decision that matches or partially matches the consensus contract outcome information.

Next, in step 510, the system receives and third-party decision information. Next, in step 520, the system determines the consensus contract outcome. Next, in step 530, the system would compare the consensus contract outcome of the third-party decision information to determine if the third-party decision information matched or partially match the third-party decision information of other third-parties. Next, in step 530, based upon the decision information received from the decentralized network of third-parties, the system will determine the consensus contract outcome. Next, in step 540, the system would adjust the third-party rating based upon whether the third-party decision information was correct (further explained below and in FIG. 6A and FIG. 6B). Next, in step 550, the system would be configured for transmitting an award, if applicable, to the third-party. In one embodiment the reward may also include an entertaining experience associated with subject matter of the underlying contract and in other embodiments the entertaining experience may not be associated with the subject matter of the underlying contract or real time event. The entertaining experience may be provided to the user interface of the third party before the consensus outcome has been determined and after the consensus outcome has been determined and may be associated with associated with the third party determination relative to the consensus outcome, wherein such entertaining experiences may be any one of those mentioned above and illustrated in FIGS. 7A-8B.

FIG. 6A and FIG. 6B will be discussed together. FIG. 6A is a table showing a rating adjustment for the rating for each third-party for the apparatus, code, methods, and systems for confirming, modifying, causing to be performed and recording outcome related to contracts between a first user and a second user, thereby providing proof of trustworthiness of the transaction, according to an example embodiment. FIG. 6B is a formula for calculating a reward based upon third-party rating, for the apparatus, code, methods, and systems for confirming, modifying, causing to be performed and recording outcome related to contracts between a first user and a second user, according to an example embodiment. In one embodiment, the code is configured for transmitting, over the communications network, a third-party reward corresponding to the rating of each third-party. Third-parties are incentivized to retain a high rating for inputting correct data related to third-party decisions and are punished for inputting data related to incorrect third-party decisions. The exact metrics for maximum reward per input will be established independently in each application based on the industry and ecosystem it is working in. In one embodiment, the reward provided to the third-party may be corresponding to a function of the amount of third-party decisions, third-party correct decisions and third-party incorrect decisions and other factors. The amount provided to each third-party for a correct or accurate third-party determination may be a monetary reward as a fee for performing the work of the third-party, which may be based upon an amount of the entire amount of the contract, such as a 0.25% fee, a 0.50% fee, etc.

FIG. 6A and FIG. 6B each reflect one example of how the third-party reward may be calculated and adjusted based upon the third-party rating. Referring to FIGS. 6A and 6B, r is the third-party reward percentage based upon a set maximum fee. In one embodiment, the maximum reward may be of 100% of the fee is the penalty or negative effect of the rating with each incorrect third-party answer, with the yield being the relevant decrease in reward. In other words, with each incorrect third-party decision, the third-party rating decreases, which also exponentially decreases the amount of third-party reward received by the third-party. Referring to FIG. 6A, column 610 refers to the third-party rating, column 620 refers to the amount of incorrect answers, column 630 refers to the adjustment of the third-party reward, column 640 refers to the percentage of the amount of the reward for each third-party.

By way of example, in row 615, the amount of incorrect third-party decisions equals zero. As a result, the third-party has a third-party rating of 100%, has a $2^0$ adjustment or penalty and as a result receives 100% the third-party reward offered for each third-party. It is further understood that having a higher present rating may be considered of benefit given that the third-party receives 100% of the third-party reward. Additionally, other means for increasing the amount of benefits or reward for correct answers may also be used and are within the spirit and scope of the present invention. It is further understood that having a higher present rating may be considered of benefit given that the third-party receives 100% of the third-party reward. In other embodiment, the rating may be provided with a positive benefit as a calculated average of the total number of correct determinations or decisions the third-party has provided for the network—not solely the number of disputes it has been involved in. Additionally, in other embodiments, the third-party may receive a benefit if a third-party decision based upon each disputed contract when compared to the consensus contract disputed information was correct over a predetermined amount of time.

By way of another example, in row 625, the amount of incorrect third-party decisions equals 1. As a result, the third-party has a third-party rating of 99%, penalty of $2^1$ and as a result receives 98% the third-party reward offered for each third-party. By way of another example, in row 635, the amount of incorrect third-party decisions equals 2. As a result, the third-party has a third-party rating of 98%, penalty or adjustment of $2^2$ and as a result receives 96% the third-party reward offered for each third-party. By way of another example, in row 645, the amount of incorrect third-party decisions equals 3. As a result, the third-party has a third-party rating of 97%, penalty or adjustment of $2^3$ and as a result receives 92% the third-party reward offered for each third-party. By way of another example, in row 655, the amount of incorrect third-party decisions equals 4. As a result, the third-party has a third-party rating of 96%, penalty or adjustment of $2^4$ and as a result receives 84% the third-party reward offered for each third-party. By way of another example, in row 665, the amount of incorrect third-party decisions equals 5. As a result, the third-party has a third-party rating of 95%, penalty or adjustment of $2^5$ and as a result receives 68% the third-party reward offered for each third-party.

On the benefits of the present invention is that users will be able to propose a social wager (offer terms of the agreement) to other users on almost any event-from rainfall to elections. Currently, the present invention illuminates unnecessary middlemen who charge per wager fees, slow transaction times, lack of privacy and security, lack of safeguards against potential hacking, and lack of trust between players (i.e. how can players be sure that the other player pays?). Unlike traditional apps on centralized servers, the present invention decentralized nature decentralized is far less susceptible to hacking and will not require numerous middlemen to execute inefficient transactions. Utilizing the blockchain as the back-end platform, the present eliminates many of the uncertainties that plague unregulated markets.

Additionally, the subject matter associated with the contract may also include other types of subject matter. In performing party or non-performing party may be associated with either the first or second user. In other embodiments, the performing party may not be associated with the first or second user. The contract may include data elements configured for displaying on a mobile computing device of a user data associated with the contract.

Figure 11:
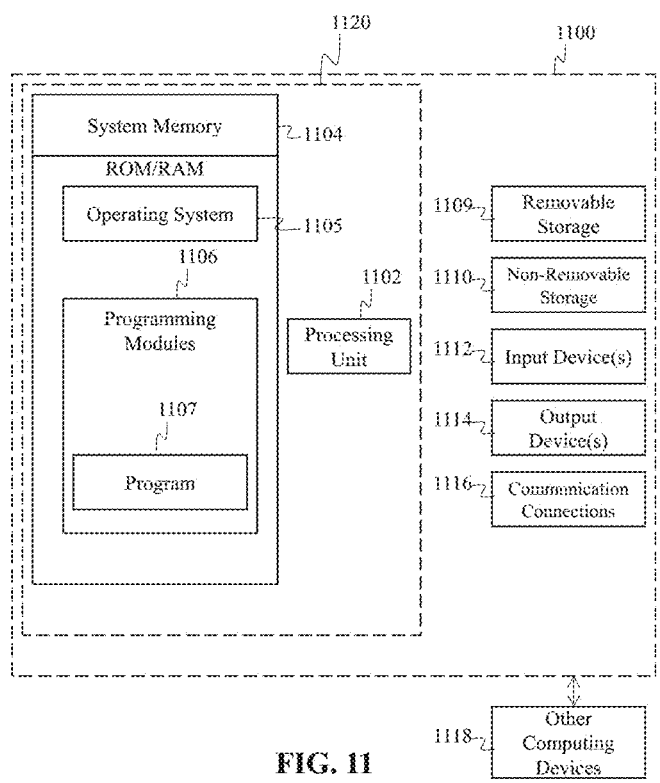

FIG. 11 is a block diagram of a system including an example computing device 1100 and other computing devices. Consistent with the embodiments described herein, the aforementioned actions performed by devices 112, 122, 132 and server 102 may be implemented in a computing device, such as the computing device 1100 of FIG. 11. Any suitable combination of hardware, software, or firmware may be used to implement the computing device 1100. The aforementioned system, device, and processors are examples and other systems, devices, and processors may comprise the aforementioned computing device. Furthermore, computing device 1100 may comprise or be included in the operating environment 100, processes 200, 300, 400, 500 and for implementing graphical displays illustrated in FIGS. 7A-10D as described above. Processes 200, 300, 400, 500 may operate in other environments and are not limited to computing device 1100.

With reference to FIG. 11, a system consistent with an embodiment of the invention may include a plurality of computing devices, such as computing device 1100. In a basic configuration, computing device 1100 may include at least one processing unit 1102 and a system memory 1104. Depending on the configuration and type of computing device, system memory 1104 may comprise, but is not limited to, volatile (e.g. random-access memory (RAM)), non-volatile (e.g. read-only memory (ROM)), flash memory, or any combination or memory. System memory 1104 may include operating system 1105, and one or more programming modules 1106. Operating system 1105, for example, may be suitable for controlling computing device 1100's operation. In one embodiment, programming modules 1106 may include, for example, a program module 1107 for executing the actions of server 102 and devices 112, 122, 132 for example. Furthermore, embodiments of the invention may be practiced in conjunction with a graphics library, other operating systems, or any other application program and is not limited to any particular application or system. This basic configuration is illustrated in FIG. 11 by those components within a dashed line 1120.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by a removable storage 1109 and a non-removable storage 1110. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a camera, a touch input device, etc. Output device(s) 1114 such as a display, speakers, a printer, etc. may also be included. The aforementioned devices are only examples, and other devices may be added or substituted.

Computing device 1100 may also contain a communication connection 1116 that may allow device 1100 to communicate with other computing devices 1118, such as over a network in a distributed computing environment, for example, an intranet or the Internet. Communication connection 1116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 1104, including operating system 1105. While executing on processing unit 1102, programming modules 1106 (e.g. program module 1107) may perform processes including, for example, one or more of the stages of the processes 200, 300 and 400 as described above. The aforementioned processes are examples, and processing unit 1102 may perform other processes and may also be configured to provide graphical representations displayed in FIGS. 7A-10D. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A non-transitory computer readable medium storing computer readable program code which when executed on a server is for keeping a user engaged with a graphical user interface while disputed information associated with a contract outcome is resolved, and recording a verified contract outcome associated with a contract between a first user and a second user, wherein said code is configured for:

receiving, over a communications network, protocols for the contract associated with a triggering event intended to occur in the future;

receiving, over the communications network, triggering event information associated with the triggering event;

determining the contract outcome based upon the protocols after the triggering event information is received;

receiving, over the communications network, within a predetermined amount of time after the triggering event information has been received, disputed information associated with the contract outcome from at least one of a first user computing device and a second user computing device;

if no disputed information is received within the predetermined amount of time, then recording the contract outcome information on a distributed ledger;

if disputed information is received within the predetermined amount of time, then transmitting, over the communications network, disputed information to a remote computing device of at least one third party for each third-party to perform a third-party analysis of the disputed information;

providing, over the communications network, a status information to at least one of a first graphical user interface of a first user computing device of the first user and a second graphical user interface of a second user computing device of the second user, the status information configured to display on the first or second graphical user interface a first graphical representation related to a status of the disputed information, wherein the first graphical representation includes a first informative experience indicating that the verified contract outcome has not been determined, wherein the first informative experience includes a first entertaining experience of a referee reviewing a play or call not associated with the triggering event or the disputed information;

receiving, over the communications network, third-party decision information associated with the disputed information from each third party that performed the third-party analysis of the disputed information;

determining a consensus contract outcome based upon third-party decision information received wherein the consensus contract outcome is derived from a threshold of matching third-party decision information;

providing, over the communications network, a consensus contract outcome information associated with the consensus contract outcome to at least one of the first graphical user interface and a second graphical user interface, the consensus contract outcome information is configured to display on the first or second graphical user interface a second graphical representation related to the consensus contract outcome, wherein the second graphical representation includes a second entertaining experience of a referee signaling one or more events not associated with the triggering event or the disputed information and selected from the group consisting of a score, a goal, a touchdown, a field goal, a missed goal and a missed field goal; and, recording the consensus contract outcome information on a distributed ledger.

2. The non-transitory computer readable medium storing computer readable program code of claim 1, wherein said code is further configured such that if no disputed information is received within the predetermined amount of time, then causing the contract to be performed such that the verified contract outcome corresponds with the contract outcome.

3. The non-transitory computer readable medium storing computer readable program code of claim 1, wherein said code is further configured such that after determining the consensus contract outcome based upon third-party decision information received, then causing the contract to be performed such that the verified contract outcome corresponds with the consensus contract outcome.

4. The non-transitory computer readable medium storing computer readable program code of claim 1, wherein the code is further configured for:

assigning a rating to each third party;
adjusting the rating of each third party;
wherein the rating of the third-party receives a penalty if its corresponding third-party decision information does not match the consensus contract outcome, and,
wherein the rating of the third-party receives a benefit if the third-party decision information matches the consensus contract outcome.

5. The non-transitory computer readable medium storing computer readable program code of claim 4, wherein the code is further configured for transmitting, over the communications network, disputed information to the third-parties in a predetermined order corresponding to the of each third party.

6. The non-transitory computer readable medium storing computer readable program code of claim 4, wherein the code is further configured for transmitting, over the communications network, a third-party reward corresponding to the rating of each third party.

7. The non-transitory computer readable medium storing computer readable program code of claim 1, wherein the second graphical representation includes a second informative experience displaying the disputed information relative to the consensus contract outcome information.

8. The non-transitory computer readable medium storing computer readable program code of claim 1, wherein the code is further configured to provide to the third-party computing device, a third graphical user interface for receiving the third-party decision information, wherein the third-party decision information includes at least a gesture from the third-party for at least one of agreeing and disagreeing with the disputed information.

9. The non-transitory computer readable medium storing computer readable program code of claim 6, wherein the code is further configured for providing, over the communications network, to the third graphical user interface a third graphical representation related to a third-party reward.

10. A system, over a communications network, for keeping a user engaged with a graphical user interface while disputed information associated with a contract outcome is resolved, and recording a verified contract outcome associated with each of a plurality of contracts between a first user and a second user, wherein the system comprises:

a processor configured for:
receiving, over the communications network disputed information associated with a contract outcome associated with a contract from at least one of a first user computing device and a second user computing device;

transmitting, over the communications network, the disputed information to the remote computing device of at least one third party for each third-party to perform a third-party analysis of the disputed information;

receiving, over the communications network, third-party decision information associated with the disputed information from each third party that performed the third-party analysis of the disputed information;

determining a consensus contract outcome based upon third-party decision information received;

recording the consensus contract outcome on a distributed ledger;

providing, over the communications network, to at least one of the first graphical user computing device and the second user computing device, the consensus contract outcome information associated with the consensus contract outcome;

providing, over the communications network, a first status information to at least one of a first graphical user interface of the first user computing device and a second graphical user interface of the second user computing device of the second user, the first status information configured to display on at least one of the first and second graphical user interface a first graphical representation related to a status of the disputed information, and wherein the first graphical representation includes a first informative experience indicating that the verified contract outcome has not been determined, the first informative experience being a first entertaining experience not associated with a subject matter of the contract, wherein the first entertaining experience includes a graphical representation of a referee reviewing a play or call not associated with the subject matter of the contract; and providing, over the communications network, a second status information to at least one of the first graphical user interface of the first user computing device and the second graphical user interface of the second user computing device of the second user, the second status information configured to display on at least one of the first and second graphical user interface a second graphical representation related to the consensus contract outcome, and wherein the second graphical representation includes a second informative experience indicating that the verified contract outcome has been determined, the second informative experience being a second entertaining experience not associated with the subject matter of the contract, wherein the second entertaining experience includes a graphical representation of a referee signaling one or more events not associated with the triggering event or the disputed information, the one or more events selected from the group consisting of a score, a goal, a touchdown, a field goal, a missed goal and a missed field goal.

11. The system of claim 10, wherein the processor is further configured for:
assigning a rating to each third party;
adjusting the rating of each third party;
wherein the rating of the third-party receives a penalty if its corresponding third-party decision information does not match the consensus contract outcome, and,
wherein the rating of the third-party receives a benefit if the third-party decision information matches the consensus contract outcome.

12. The system of claim 10, wherein the processor is further configured for transmitting, over the communications network, disputed information to the third-parties in a predetermined order corresponding to the rating of each third party.

13. A non-transitory computer readable medium storing computer readable program code which when executed on a server is for keeping a user engaged with a graphical user interface while disputed information associated with a contract outcome is resolved and recording a verified contract outcome associated with each of a plurality of contracts between a first user and a second user, wherein said code is configured for:

receiving, over a communications network, a contract packet for each contract, wherein the contract packet includes protocols associated with a triggering event intended to occur in the future;

receiving, over the communications network, triggering event information associated with the triggering event;

determining, based upon the protocols, a contract outcome based upon the protocols after the triggering event information is received;

receiving, over the communications network, within a predetermined amount of time after the triggering event information has been received, disputed information associated with the contract outcome from at least one of a first user computing device and a second user computing device;

if no disputed information is received within the predetermined amount of time, then causing the contract to be performed such that the verified contract outcome corresponds with the contract outcome and recording the contract outcome information on a distributed ledger;

if disputed information is received within the predetermined amount of time, then transmitting, over the communications network, the disputed information to the remote computing device of at least one third party for each third-party to perform a third-party analysis of the disputed information;

providing, over the communications network, a status information to at least one of the first graphical user interface of a first user computing device of the first user and a second graphical user interface of a second user computing device of the second user, the status information configured to display on the first or second graphical user interface a first graphical representation related to a status of the disputed information, wherein the first graphical representation includes a graphical representation of a referee reviewing a play or call not associated with the triggering event or the disputed information;

providing to a third graphical user interface of the third-party computing device, the third graphical user interface for receiving third-party decision information, wherein the third-party decision information includes at least a gesture from the third-party for at least one of agreeing and disagreeing with the disputed information;

receiving, over the communications network, third-party decision information associated with the disputed information from each third party that performed the third-party analysis of the disputed information;

determining a consensus contract outcome based upon third-party decision information received;

causing the contract to be performed such that the verified contract outcome corresponds with the consensus contract outcome;

providing, over the communications network, a consensus contract outcome information associated with the consensus contract outcome to at least one of the first graphical user interface and a second graphical user interface, the consensus contract outcome information configured to display on the first or second graphical user interface a graphical representation related to the consensus contract outcome wherein the second graphical representation includes a second informative being an entertaining experience displaying the disputed information relative to the consensus contract outcome information, the entertaining experience including a graphical representation of a referee signaling one or more events not associated with the triggering event or the disputed information, the one or more events selected from the group consisting of a score, a goal, a touchdown, a field goal, a missed goal and a missed field goal; and, recording the consensus contract outcome information on a distributed ledger.

14. The non-transitory computer readable medium storing computer readable program code of claim 13, wherein the code is further configured for:

assigning a rating to each third party;

adjusting the rating of each third party;

wherein the rating of the third-party receives a penalty if its corresponding third-party decision information does not match the consensus contract outcome, and, wherein the rating of the third-party receives a benefit if the third-party decision information matches the consensus contract outcome.

15. The non-transitory computer readable medium storing computer readable program code of claim 14, wherein the code is further configured for transmitting, over the communications network, disputed information to the third-parties in a predetermined order corresponding to the rating of each third party.

* * * * *